(12) United States Patent  
Cuallo (10) Patent No.: US 6,483,901 B1  
(45) Date of Patent: Nov. 19, 2002

(54) NON-VOLATILE MEMORY PLATFORM FOR DIGITAL ANSWERING SYSTEMS

(75) Inventor: Jose de Jesus Cuallo, Eatontown, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/343,385

(22) Filed: Jun. 30, 1999

Related U.S. Application Data (60) Provisional application No. 60/091,214, filed on Jun. 30, 1998.

(51) Int. Cl.[7] .................................................. H04M 1/64
(52) U.S. Cl. ...................... 379/88.28; 379/67.1; 379/83; 379/88.22; 379/88.18; 379/88.27
(58) Field of Search ...................... 379/67.1, 83, 88.22, 379/88.25, 88.27, 88.28, 68, 88.18, 88.23, 88.24

(56) References Cited

U.S. PATENT DOCUMENTS

| | | | | |
|---|---|---|---|---|
| 4,757,525 A | * | 7/1988 | Matthews et al. | 379/88 |
| 5,699,411 A | * | 12/1997 | Becker et al. | 379/88 |
| 6,044,136 A | * | 3/2000 | Takahashi et al. | 379/93.23 |
| 6,058,180 A | * | 5/2000 | Young | 379/234 |
| 6,160,739 A | * | 12/2000 | Wong | 365/185.29 |
| 6,295,342 B1 | * | 9/2001 | Kaminsky | 379/88.23 |

* cited by examiner

Primary Examiner—Allan Hoosain  
(74) Attorney, Agent, or Firm—Duane Morris LLP (57) ABSTRACT

A memory management method for a digital answering system having a non-volatile memory, e.g., flash memory, for storing files of audio messages. In accordance with the method, a first portion of the memory is dedicated for the storage of file information, and a second portion for the storage of message data. A number of rotary storage areas are defined within the first memory portion, with said file information being stored within only one of the rotary storage areas at any given time. Following a predetermined number of write operations to the one storage area, its contents are transferred to another one of the rotary storage areas. A file allocation table is employed which maps the memory of the flash memory. A directory includes directory entries which provide a first row for message data. A data area where messages are stored includes pointers to a next sequence or word in the memory such that a chain of words or sequences in a message file are retrieved in a single access to the first portion of memory.

27 Claims, 6 Drawing Sheets

NON-VOLATILE MEMORY PLATFORM FOR DIGITAL ANSWERING SYSTEMS

RELATED APPLICATION DATA

This application claims priority to Provisional Application Serial No. 60/091,214 filed Jun. 30, 1998 which is incorporated herein by reference.

BACKGROUND OF THE INVENTION

1. Field of the Invention

The present invention relates generally to digital answering systems employing non-volatile memory such as flash memory for audio storage, and more particularly to a file management system for extending lifetime for serial interface non-volatile memory for answering systems.

2. Description of the Related Art

In recent years, the trend in digital answering system design has been to employ a non-volatile storage medium such as flash memory for audio message storage. In contrast to random access memory (RAM), non-volatile memory does not lose data stored in memory upon the removal of applied power. Flash memory is desirable as a non-volatile medium in that it draws power at a rate far below that of RAM, and the medium has no mechanical component requiring power. One limitation of flash memory, however, is that it must first erase data from a given physical address before new data can be written to that address.

To date, most (if not all) commercial digital answering systems with flash memory storage have used a parallel data interfaces to write/read data to/from the flash memory chip. A drawback to the parallel interface approach is the increased complexity of the wiring arrangements to carry data and address information to/from and within the flash memory chip. With the trend towards ever increasing miniaturization of memory cell area, the complex wiring necessitated by a parallel interface is a considerable obstacle for further improvement. Also, answering systems with parallel interface flash memories usually delete messages by implementing large block movements, typically about 4 Kb blocks.

Recently, flash memory chips suitable for audio data storage which use a serial interface have become commercially available. One example is the Atmel Corporation's Serial DataFlash™ memory chip line. Although naturally slower than the parallel interface, the serial interface dramatically simplifies the wiring arrangement of the flash memory and the processor interface. In addition, considerably smaller block sizes, typically 256 bytes, are used to erase data.

One shortcoming of flash memories such as the Atmel DataFlash™ resides in the limited memory cell lifetime. Flash memory chip manufacturers usually specify the maximum number of guaranteed write operations that can be performed to any given cell. At the present time, maximum guaranteed writes of 10,000 to 30,000 are typical for commercially available flash memories. Consequently, the flash memory lifetime is a significant factor in the long term reliability of the answering system.

Therefore, a need exists for a system which allocates memory storage in a non-volatile memory system which increases the systems usable life. A further need exists for improving serial interface memory systems.

SUMMARY OF THE INVENTION

In a digital answering system having a non-volatile memory for storing files of audio messages, a memory management method, in accordance with the present invention, includes the step of dedicating a first portion of the memory for the storage of file information, and a second portion for storing message data. The method includes defining a plurality of rotary storage areas within the first memory portion, with the file information being stored within one of the rotary storage areas at any given time. The contents of the one rotary storage area are transferred to another rotary storage area following a predetermined number of write operations to the one storage area.

In alternate methods, the step of dedicating the first memory portion for the storage of answering system information is included. The answering system information may include a count indicating how many times a current rotary storage area has been written to. The step of storing an audio message in rows of the second memory portion along with address information indicating a memory location for a next portion of the message may also be included. The data may be written to and read from the non-volatile memory via a serial data interface. The non-volatile memory preferably includes a flash memory.

A flash memory, in accordance with the present invention, includes a first portion of the memory for the storage of file information, and a second portion for storing message data. A file allocation table is disposed in the first portion of the memory. The file allocation table includes a plurality of rotary storage areas for storing file information such that only one of the rotary storage areas includes stored file information at any given time. Means for transferring the stored file information to another of the rotary storage areas when a predetermined number of operations have been performed is also included.

A serial data interface flash memory, in accordance with the present invention, includes a first portion of the memory for the storage of file information, and a second portion for storing message data. A file allocation table is disposed in the first portion of the memory. The file allocation table includes a plurality of rotary storage areas for storing file information such that only one of the rotary storage areas includes stored file information at any given time. A counter is adapted to count a number of write operations for the one of the rotary storage areas. At least one memory buffer is included for temporarily storing the stored file information to transfer the stored file information to another of the rotary storage areas when a predetermined number of write operations have been performed on the one of the rotary storage areas.

In alternate embodiments, the flash memory may include a directory structure for organizing the first portion and the second portion of the memory. The first portion of the memory preferably includes directory entries. Each directory entry may include a field for storing an address of a first data entry wherein data entries are stored in the second memory portion and form a chain of data entries which comprise a message file. Each directory entry may include an alias identifier for representing a type and availability of data stored in the directory entry. The data entries each include a pointer which points to an address of a next data entry in the chain of data entries which comprise a message file. The file allocation table preferably provides a map of memory usage in the memory. The file allocation table may include an alias identifier for designating usage of a row of memory.

The flash memory is preferably employed in a telephone answering system. The flash memory may include a write protected portion of memory for recording prompts and/or announcements for the answering system. The means for transferring may include a file manager program. The means for transferring may also include at least one memory buffer. The flash memory may further include a file manager program for managing the transfer of the stored file information.

These and other objects, features and advantages of the present invention will become apparent from the following detailed description of illustrative embodiments thereof, which is to be read in connection with the accompanying drawings.

BRIEF DESCRIPTION OF DRAWINGS

The following detailed description, given by way of example and not intended to limit the present invention solely thereto, will best be appreciated in conjunction with the accompanying drawings, in which like reference numerals denote like parts of elements, wherein.

DETAILED DESCRIPTION OF PREFERRED EMBODIMENTS

The present disclosure pertains to a memory management method and apparatus for a digital answering system having a non-volatile memory, e.g., flash memory, for storing files of audio messages. In accordance with a method, a first portion of the memory is dedicated for the storage of file information, and a second portion for the storage of message data. A number of rotary storage areas are defined within the first memory portion, with the file information being stored within only one of the rotary storage areas at any given time. Following a predetermined number of write operations to the one storage area, its contents are transferred to another one of the rotary storage areas. In this manner, the method allows for the storage of file management data within the non-volatile memory without excessively overwriting to the memory, thereby extending the memory life. Preferably, read and write operations to the memory are performed via a serial interface. Further, addresses for message sequences are stored in the message data portion of the memory instead of in a file allocation table. In this way, the number of memory accesses for the first portion of the memory is significantly reduced.

Figure 1:
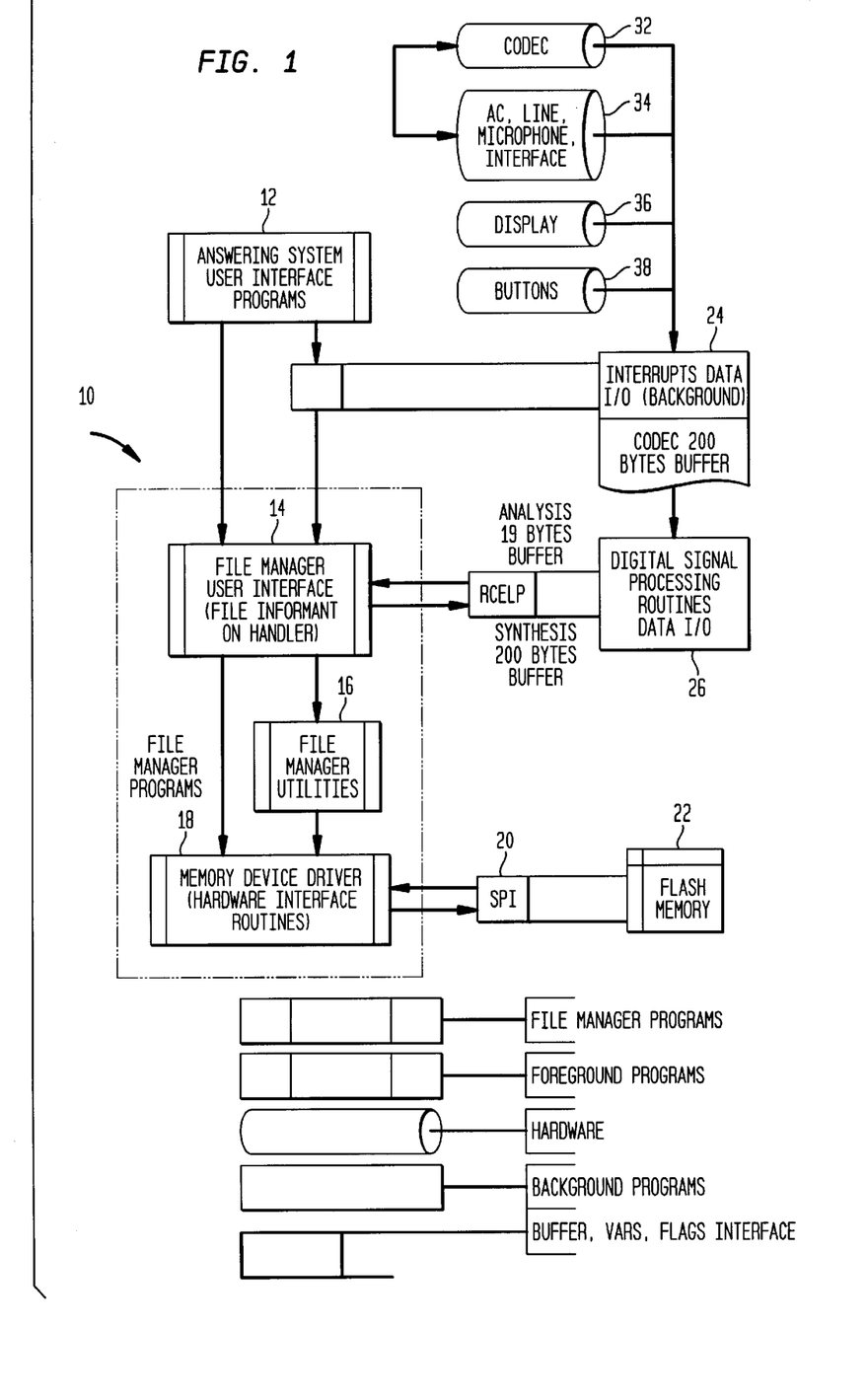
FIG. 1 is a block diagram of an embodiment of a digital answering system in accordance with the invention.

Referring to FIG. 1, an embodiment of a digital answering system 10 in accordance of the invention is shown in a block diagram. Answering system 10 may be tailored for use with a single telephone and dedicated line. Alternatively, system 10 can be designed for use as a voice mail system for a number of telephone extensions and associated users is a network as in an office environment.

The heart of answering system 10 is a file manager user interface program 14 running on a processor. As will become apparent hereafter, file manager interface 14 manages the storage and retrieval of message and system information files in flash memory 22 in a manner sufficient to conserve flash memory cells and thereby prolong the answering system lifetime. Flash memory 22 is written to and read from via a serial processor interface (SPI) 20. Flash memory 22 and SPI 20 may together be formed by a commercially available integrated circuit flash memory chip such as the Atmel DataFlash™. SPI 20 receives read/write and other control signals from a memory device driver 18, which in turn receives instructions from interface 14 and from file manager utilities 16.

Answering system user interface programs 12 control the various user functions, providing information to the user through display 36 and the system microphone 34. These programs are also responsive to interrupts 24 initiated by the user through keys (or buttons) 38, forwarding user requests for message data and so forth to file manager user interface 14. When a call comes in, programs 12 and 14 cooperate to control the automatic answering function after a predetermined number of rings. Incoming audio messages are routed to coder/decoder (codec) 32 through the AC, microphone and line interface 34. Codec 32 digitizes the audio, which is then processed further by means of digital signal processing routines 26 prior to storage in flash memory 22. Such processing is typically based on a linear prediction algorithm, e.g., RCELP.

Figure 2:
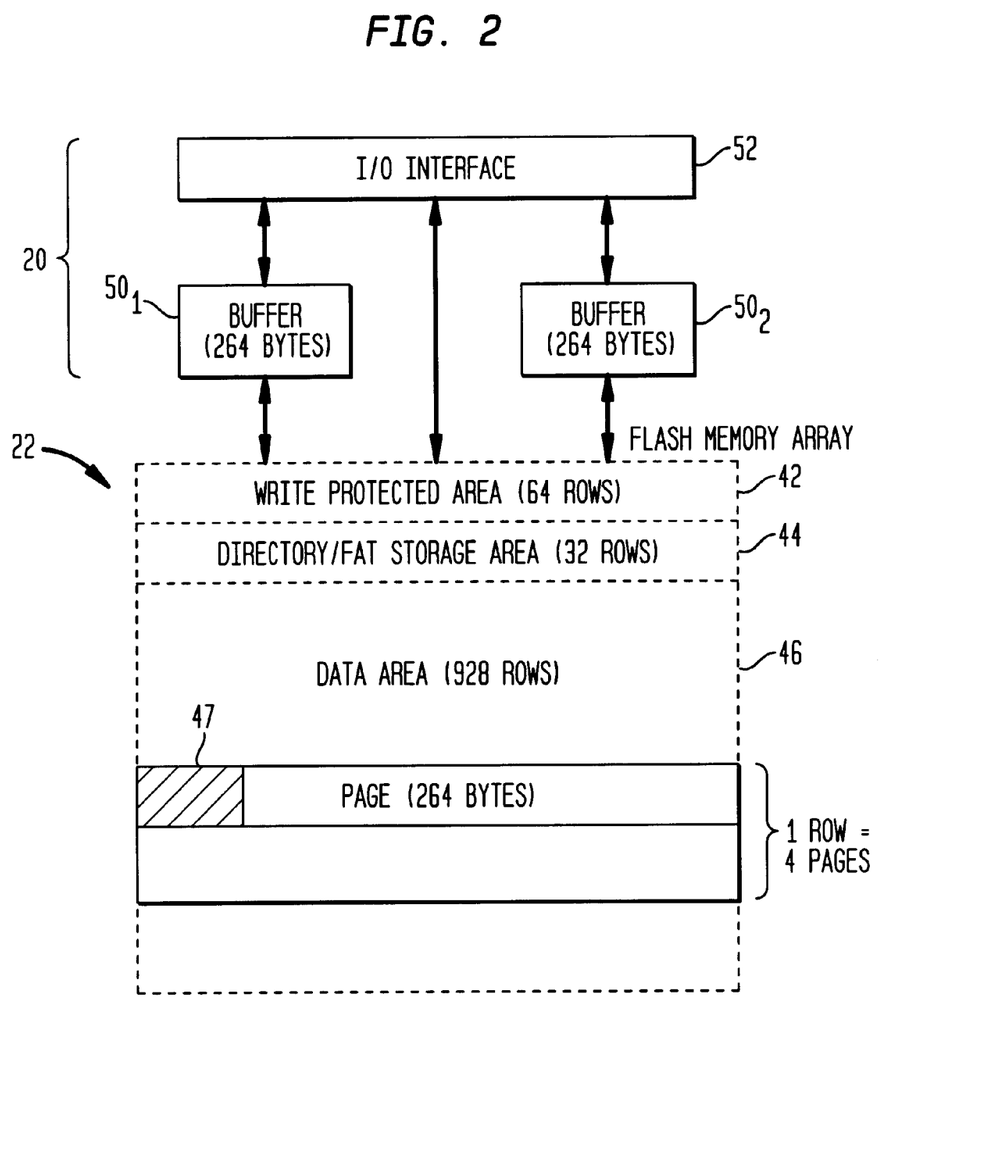
FIG. 2 is a block diagram of an exemplary flash memory circuit in accordance with the invention.

With reference now to FIG. 2, an exemplary arrangement of flash memory array 22 in accordance with the invention is illustrated. The array is structured with a write protected area 42 (e.g., 64 rows), a directory/file allocation table (FAT) storage area 44 (e.g., 32 rows) and a data area 46 (e.g., 928 rows). In this embodiment, a row of data is considered to be formed by four pages of 256 bytes each, although other memory capacities may be employed, e.g., 264 bytes each. A page is a standard data block—data is transferred to and from the flash memory in units of pages.

As shown in the figure, a page is stored in a section of memory cells physically extending across the flash memory array. Serial processor interface 20 is comprised of a serial I/O interface 52 and a pair of buffers $50_1$ and $50_2$, each capable of storing one page of data. While one of the buffers is writing data to flash memory array 20, the other may be reading data from the array. Buffers $50_1$ and $50_2$ may be employed in a number of different storing, writing, reading or copying operations.

In accordance with the present invention, the digital signal processor (DSP) 26 (FIG. 1) looks at a FAT in storage area 44 to determine available memory in flash memory 22 (FIG. 1). Once memory allocation and message sequencing is known, DSP 26 writes the information to one or more of buffers $50_1$ and $50_2$. After the information is sent to the buffers 50, the buffers 50 write the information to the memory (in areas 44 and 46). Advantageously, buffers $50_1$ and $50_2$ write all the data to the appropriate areas of memory 22 in one step. This reduces the number of write operation significantly, since all the information is transferred at once.

Figure 3:
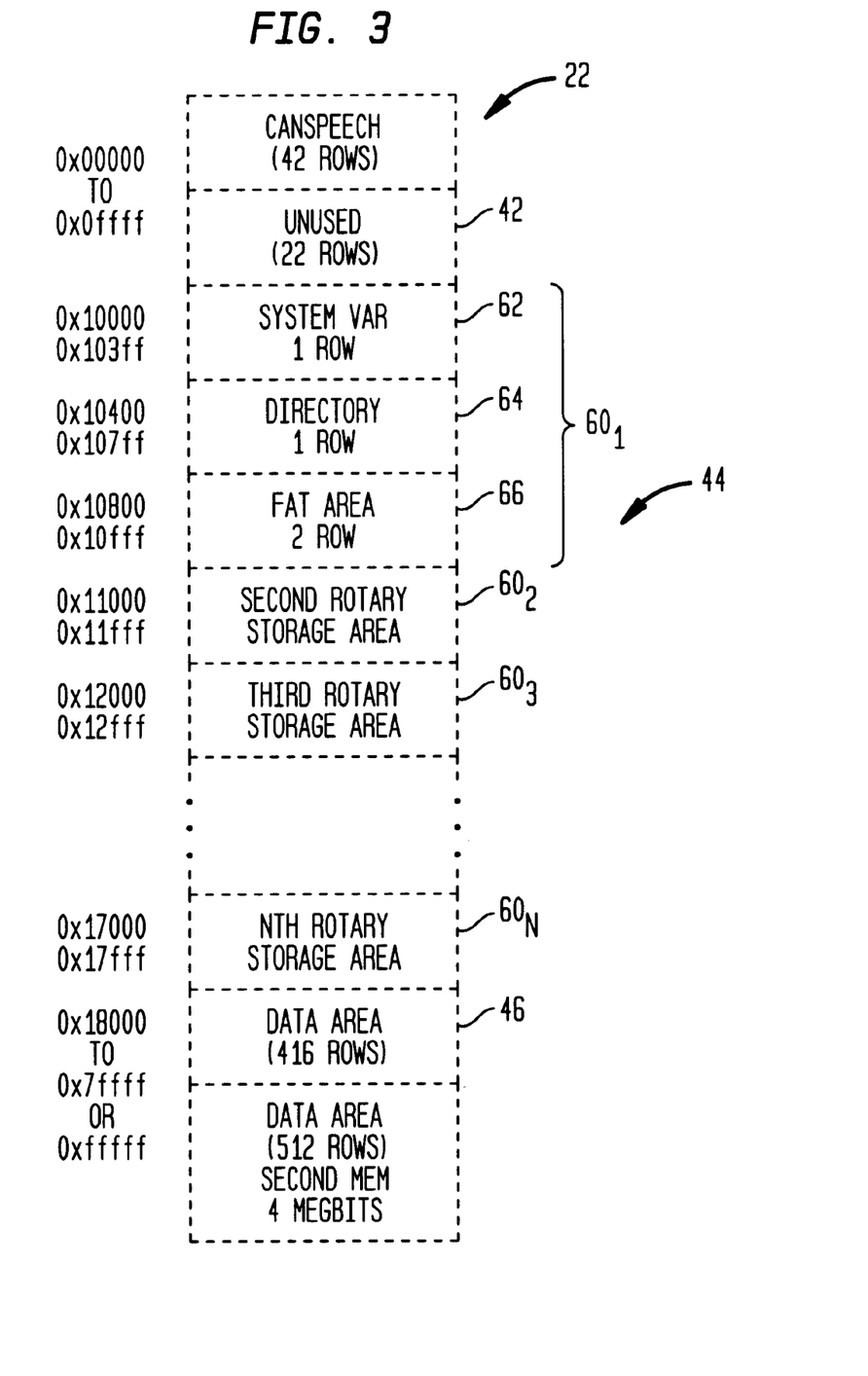
FIG. 3 illustrates a flash memory array storage arrangement in accordance with the invention.

Turning now to FIG. 3, the exemplary data storage arrangement for flash memory array 22 is shown in more detail. The DIR/FAT storage area 44 is defined with N rotary storage areas $60_1$ to $60_N$. Each of the rotary storage areas 60 includes a system variable area 62, a directory area 64 and a FAT area 66. The information stored within directory area 64 and FAT area 66 may be similar to file location data stored on a personal computer hard disk by the MS-DOS (trademark of Microsoft Corporation) operating system with several significant differences. One important difference is as follows. In MS-DOS systems all pointers for addresses for pieces of a given file are maintained in a FAT. To retrieve the file the FAT must be accessed each time to recover the sequences of the chain to reproduce the file. This requires accessing the FAT many times (i.e., once for each file piece). In accordance with the present invention, a FAT in area 44 is provided which is a map of the space showing the availability and usage of the memory 22. The present invention provides a directory in area 44 which includes directory entries. The directory entries provide the location of a first row of information of the file to be accessed. Once accessed in data area 46, the message data in data area 46 includes a word having a pointer for pointing to the address of the next portion or sequence in a chain of sequences from which the entire file (message) is recreated.

In accordance with another aspect of the invention, only one of the rotary buffers $60_1$–$60_N$ stores system and file information at any given time (called an active block for convenience). For instance, during the initial use of the answering system, system and file information may be stored in storage area $60_1$ while the other storage areas $60_2$–$60_N$ remain empty. During normal answering system operation, the system and file data in storage area $60_1$ are constantly updated as new messages are recorded and old messages are deleted. As stated previously, each memory cell within flash memory array 22 can only be written to a prescribed number of times before the cell weakens to the point where its reliability is jeopardized. Consequently, the flash memory manufacturer typically guarantees a maximum number of writes to each cell. Hereafter, the prescribed number of maximum write operations will be referred to as WMAX.

In accordance with the present embodiment, a counter is updated each time a new write operation is performed to the rotary storage area $60_i$ currently holding the system and file data (active block). To simplify the method, the counter is incremented by one for each new write operation to storage area $60_i$ regardless of how many cells therein are actually written to. This is due to the fact that buffers 50 are employed to write an entire page at once, so that each write operation includes a larger amount of information to reduce the number of write operations. For example, one write operation in accordance with the present invention includes one page of information.

After a predetermined number Wp<WMAX of writes to storage area $60_i$ are performed, the file manager program initiates a storage area change operation, in which all the contents of storage area $60_i$ are transferred to rotary storage area $60_{i+1}$. The counter is reset and the process is repeated. In this manner, excessive write operations to the flash memory array to carry out a directory/FAT management system are avoided. The transfer may be performed by using buffers 50 as temporary storage, copying the contents directly to a new rotary buffer or other techniques which may be known. The transfer may be initiated by employing a file manager program (or system).

The following description discloses an illustrative memory information structure in accordance with the present invention. The memory structure will be described in terms of specifics; however, these specifics should not be construed as limiting the present invention.

A serial data flash memory 22 may include memory devices with 2048 pages (4 Mbits), pages 4048 (8 Mbits) or combinations thereof. Each page (or frame) includes 256 bytes. The memory is handled in page or frame operations which may include operations such as refresh, write to memory, delete, sequential reading having a header of: 1 command byte, 3 bytes initial address and 3 bytes for synchronization. The memory includes internal buffers 50 (FIG. 2). Each buffer 50 preferably is at least one page in size which may be employed to prepare sequential or random bytes in a page before transfer of the page to memory. Each byte represents a specific memory address. A row (or chunk) is a basic storage unit for compressed speech data of files to be used for messages, voice prompts, announcements, etc. for the answering system. One row equals four pages. Each page is preferably 256 bytes.

Figure 4:
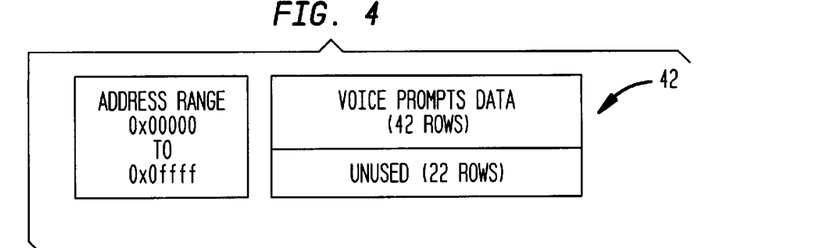
FIG. 4 illustrates a write protected data storage area for storing voice prompts and/or announcements for the present invention.

As shown in FIG. 4, the first 256 pages of the main memory of the system may be protected and cannot be programmed. This memory (64 rows=256 pages) called write protected area 42 preferably keeps voice prompts information, announcements or other data which should remain write protected unless enabled.

Figure 5:
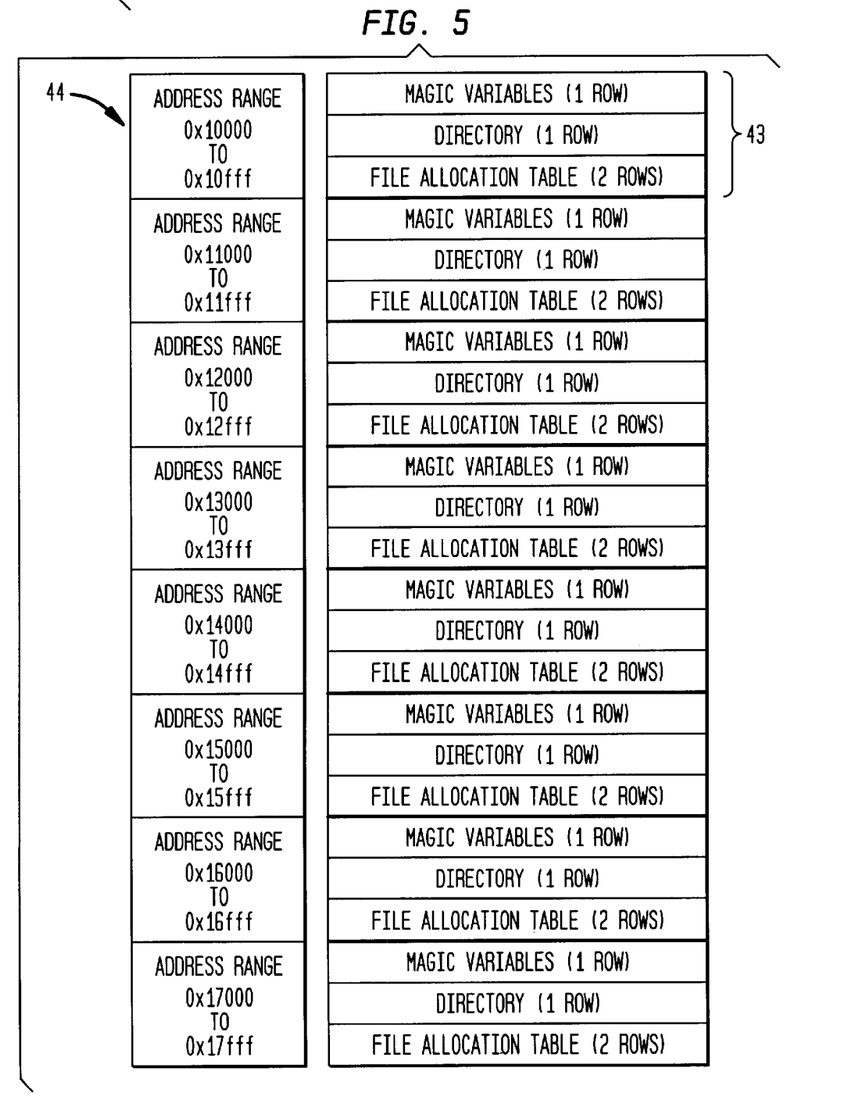
FIG. 5 illustrates a boot area memory arrangement in accordance with the present invention.

Referring to FIG. 5, a boot area 44 is illustratively shown in accordance with the present invention. A file manager 16 (FIG. 1) defines a memory section below the protected area 42 to keep magic variables (or user variables), directory and file allocation table information. In a preferred embodiment, eight slots 43 are provided including 4 rows which are needed to create a boot structure for each slot. A different number of slots may also be provided, for example, 12, 16, etc. The slot structure extends the product life since the portion of the memory that is most affected for the writing process is the first page of a Directory Row. A rotary system is employed to shift usage of the memory to each of the 8 slots over the lifetime of the product. FIG. 5 shows a rotary buffer structure used to employ the rotary system. The rotary system is also employed to copy an image (or representation) of the boot structures (or slots) 43 during delete processes to avoid corruption of information due to power failures during the update process of the directory and the file allocation tables.

Figure 6:
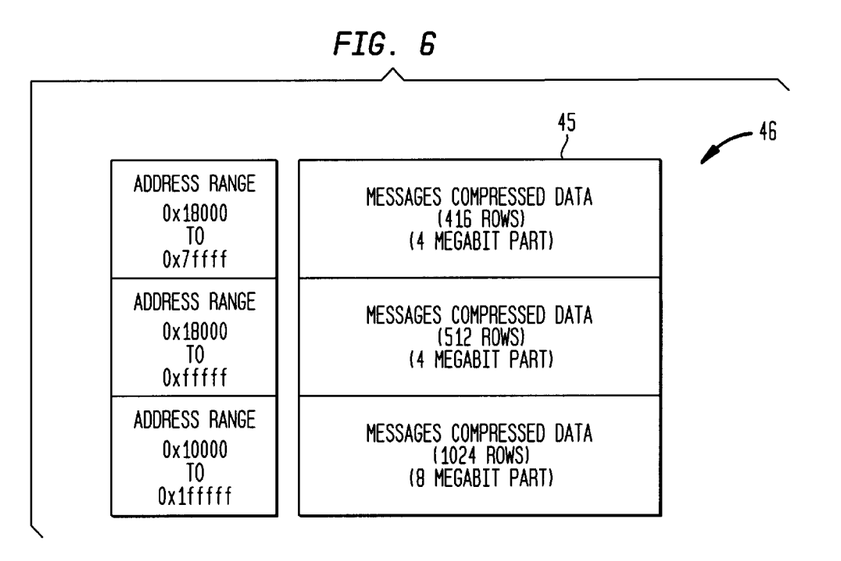
FIG. 6 illustrates a message data memory arrangement in accordance with the present invention.

Referring to FIG. 6, a data area 46 is included for compressed voice data. This area may be defined below the boot area 44. A first memory area 45 is reduced in its voice data storage capacity because of the boot area 44 and protected area 42.

Figure 7:
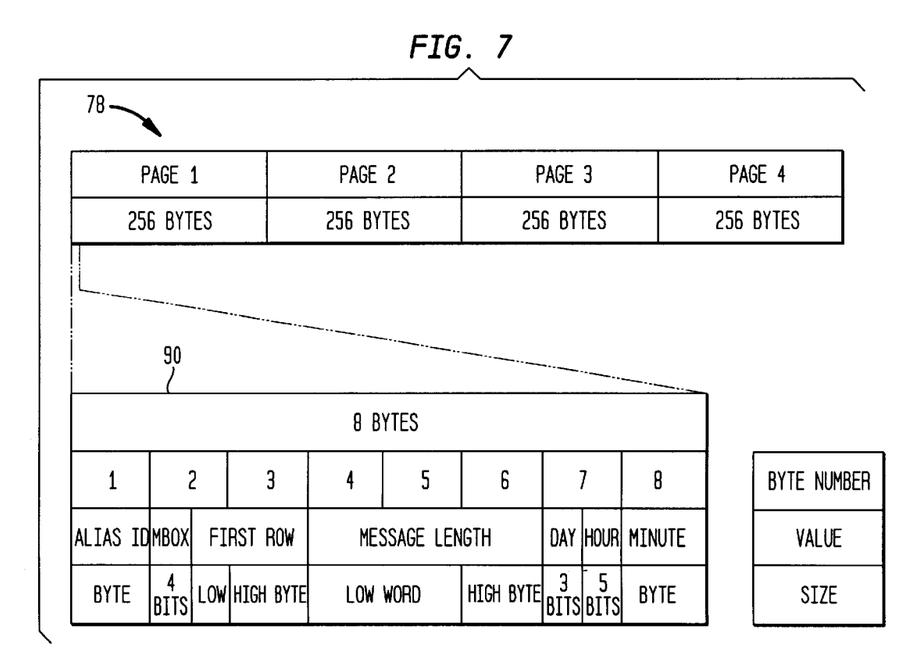
FIG. 7 illustrates directory cells or directory entries in the directory storage area in accordance with the present invention.

Referring to FIG. 7, A directory (DIR) 78 in the directory/FAT storage area 44 (FIGS. 2 and 5) of the present invention includes directory basic cells or directory entries 90. Each directory entry 90 preferably includes 8 bytes and is divided up into fields as illustratively shown in FIG. 7. An Alias ID field is a numeric identifier preferably going from 0 to 0xff (byte size). This number or identifier names a file to be recognized in the FAT and DIR.

In one embodiment Alias IDs may include the following designation numbers:

0–98=Message Number
99–106=Announcement Number
107=Unusable Row (non-usable in protected area)
108=Boot Row
109=Synthetic Voice Prompts Row (in protected area)
110–128=Available row.

In the mailbox field (Mbox) a specific mailbox for an individual user may be designated. Up to 16 mailboxes can be assigned each using 4 bits each if the memory capacity is as shown in this embodiment. A First Row field provides a first address of the row with the voice compressed data of that specific file. Advantageously, the complete chain of rows including the data of the file will be collected from the first word of every next row in data area 46 (FIG. 2). The FAT advantageously includes (as described below) only the Alias of each file and does not have to include the entire chain. In this way, the FAT is only a map of the used memory, keeping track of the available space thereby conserving memory space and usage.

A Message Length field counts the number of bytes of the compressed file data. Time stamp fields include Day (3 bits, 0–7 Sunday to Saturday), Hour (5 bits, 0–24, AM and PM included) and Minute (8 bits, 0–59). With 1024 bytes, 128 directory entries are available for each row.

DIR includes floating and non-floating files. Floating files (e.g., the first 99 directory entries) are employed to assist in maintaining the sequence of incoming messages. For example, in messages are deleted between other messages, later messages can shift to fill the empty memory space. Non-floating files (e.g., the next 29 directory entries) are employed to store files, such as, announcements and prompt files.

Figure 8:
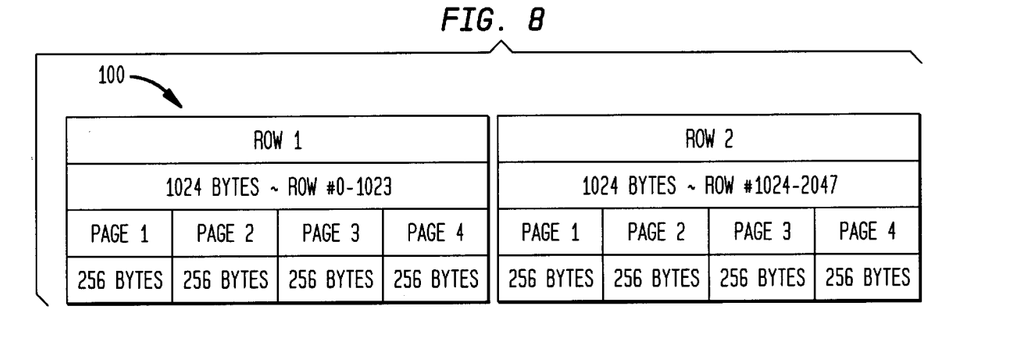
FIG. 8 illustrates a file allocation row structure in accordance with the present invention.

Referring now to FIG. 8, an illustrative embodiment of the FAT structure of storage area 44 (FIGS. 2 and 5) in accordance with the present invention will now be described. A file allocation table (FAT) structure 100 is employed to permit a mapping of memory use. The structure is byte level based. The FAT structure 100 employed in accordance with the present invention provides an image of the memory in terms of row usage. The FAT structure 100 is employed to maintain a "view" of the memory. The FAT structure 100 is preferably updated once every message which is received in memory. Preferably the update will be performed at the end of the message. Each row (Row 1, Row 2) includes 1024 bytes which are divided into pages (1–4 for each row). Each page includes 256 bytes. The First Row (see FIG. 7) of every file 90 is used to store FAT information which maps the memory of the rest of the file. Each byte in structure 100 represents one row. The row represented depends on the position within the FAT structure. Every byte takes the values of an alias identifier (Alias ID, see FIG. 7) for the file using the assigned row. To allocate memory space for a new message, a file allocation table stored in FAT structure 100 is searched. An available alias identifier in any byte position will mark that row as available. To delete a file, the message alias identifier is removed and substituted for an available alias identifier value.

Figure 9:
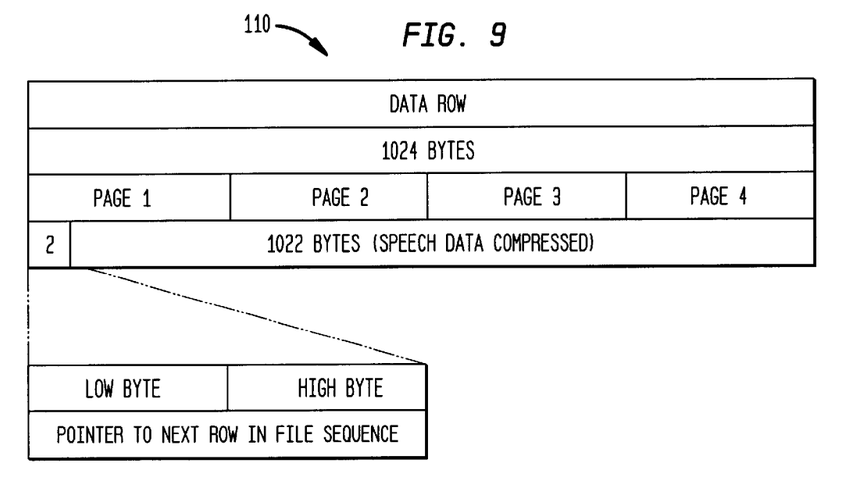
FIG. 9 illustrates a data row memory arrangement in accordance with the present invention.

Referring to FIG. 9, a data row structure 110 of data area 46 (FIG. 2) is shown in accordance with one illustrative embodiment of the present invention. A Data Row includes 1022 bytes of compressed voice coefficients. A RCELP compressed algorithm may be employed to compress this data in a ratio of, for example, 200 to 19. This means that for 200 analog to digital samples, the storage data is reduced to 19 bytes. For a sampling rate of 8000 bytes per second (each sample with 256 levels), a compression algorithm gives 19 bytes/0.025 sec=760 bytes/sec. Therefore, one row provides 1022 bytes/760 bytes/sec=1.345 seconds of voice. This is illustrative only and other sampling rates and compression ratios are contemplated. Advantageously, in accordance with the present invention, a first word in each row will be a pointer to the address of the next row of the file chain within data area 46. In this way, a file can be retrieved sequentially with only a single access operation of the directory. In other words, a first row is retrieved from a directory entry. This points to a first location in the message data, i.e, in data area 46). At the first location is a pointer pointing to a next location and so on until the message file is complete. This reduces the number of operation and therefore increases memory lifetime.

Figure 10:
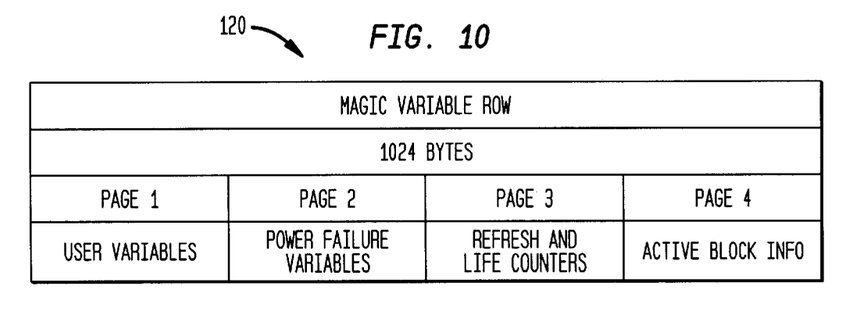
FIG. 10 illustrates a magic variable row arrangement in accordance with the present invention.

Referring to FIG. 10, magic variable rows 120 or user variable rows include 4 pages divided which include information such as user variables, power failure variables, refresh and life counters and active block information. Each byte of the 256 bytes for each page is equivalent to one variable. User variables may include volume levels, memory size, checksum, number of rings to answer, security codes, etc. Power variables are employed in the case where a power failure is experiences prior to the completion of an operation. Power failure variables include routines to restart processes not concluded due to a power failure. For example, in a deletion operation, a flag is set prior to the deletion operation to indicate erase in progress. A bit chain structure identifying the messages selected for deletion is then recorded. The operation is carried out. If not concluded. The routine can rerun the delete operation based on the recorded information.

Refresh and life counters are employed to keep track of frames' operations. Refresh counters execute actions to avoid the loss of data. The life counters are employed to rotate the boot area (active blocks) to extend product life in accordance with the present invention. As described above when a threshold is meet the data store in the boot area is rotated to maximize memory usage to avoid memory reliability problems. Also, an active block information page includes active block pointers which indicate active mirrors which include valid information. Active block pointers indicate the active block which is in use in accordance with the present invention.

By employing the file structures described above, automatic recovery of lost chains due to corruption of data events is achieved by employing auto-recovery routines. By maintaining the FAT and by reviewing aliasing information, lost chains can be reidentified. During a reset due to data corruption, unassigned alias identifiers may be used to reconstruct messages. Further, invalid alias values may be designated as available for memory storage. Other routines may include a message data integrity check for checking message chains to avoid scrambled messages, for example by identifying message chains with corrupted data.

In accordance with the present invention, the number of writes to specific areas of the flash memory are dramatically reduced by providing rotary buffer swapping during the life of the flash memory. Advantageously, this provides a significant increase in the life of the product. This is particularly useful for serial interface flash memories where the product lifetime is typically less than parallel devices. The present invention makes 10,000 to 30,000 writes to memory trivial since the memory employed is rotated or swapped. The speed for serial interfaces is increased by decreasing file manager routine execution times. This is achieved through the DIR/FAT structures as described above. Further, by employing buffers 50 extensively operation speed is increased. Buffers 50 may be employed for sorting, searching and writing operations. Serial clocks of 5 MHz or greater may also be employed to increase operational speed. The present invention also uses sequential writes and reads one page or frame at a time to increase speed by decreasing search time.

Having described preferred embodiments of non-volatile memory platform for digital answering systems (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. In a digital answering system having a non-volatile memory for storing files of audio messages, a memory management method comprising the steps of:
   dedicating a first portion of the memory for storage of file information, and a second portion for storing message data;
   defining a plurality of rotary storage areas within said first memory portion, with said file information being stored within one of said rotary storage areas at any given time; and
   transferring the contents of said one rotary storage area to another rotary storage area following a predetermined number of write operations to said one storage area.

2. The method of claim 1, further comprising the step of dedicating said first memory portion for the storage of answering system information.

3. The method of claim 2 wherein said answering system information includes a count indicating how many times a current rotary storage area has been written to.

4. The method of claim 1, further comprising the step of storing an audio message in rows of said second memory portion along with address information indicating a memory location for a next portion of said message.

5. The method of claim 1 wherein data is written to and read from said non-volatile memory via a serial data interface.

6. The method of claim 1 wherein said non-volatile memory comprises a flash memory.

7. A flash memory comprising:
   a first portion of the memory for the storage of file information, and a second portion for storing message data;
   a file allocation table disposed in the first portion of the memory, the file allocation table including a plurality of rotary storage areas for storing file information such that only one of the rotary storage areas includes stored file information at any given time; and
   means for transferring the stored file information to another of the rotary storage areas when a predetermined number of operations have been performed.

8. The flash memory of claim 7, further comprising a directory structure for organizing the first portion and the second portion of the memory.

9. The flash memory of claim 7, wherein the first portion of the memory includes directory entries, each directory entry including a field for storing an address of a first data entry wherein data entries are stored in the second memory portion and form a chain of data entries which comprise a message file.

10. The flash memory of claim 9, wherein each directory entry includes an alias identifier for representing a type and availability of data stored in the directory entry.

11. The flash memory of claim 7, wherein the data entries each include a pointer which points to an address of a next data entry in the chain of data entries which comprise a message file.

12. The flash memory of claim 7, wherein the file allocation table provides a map of memory usage in the flash memory.

13. The flash memory of claim 7, wherein the file allocation table includes an alias identifier for designating usage of a row of memory.

14. The flash memory of claim 7, wherein the flash memory is employed in a telephone answering system.

15. The flash memory of claim 13, further comprising a write protected portion of memory for recording one of prompts and announcements for the answering system.

16. The flash memory of claim 7, wherein the means for transferring includes a file manager program.

17. The flash memory of claim 7, wherein the means for transferring includes at least one memory buffer.

18. A serial data interface flash memory comprising:
   a first portion of the memory for the storage of file information, and a second portion for storing message data;
   a file allocation table disposed in the first portion of the memory, the file allocation table including a plurality of rotary storage areas for storing file information such that one of the rotary storage areas includes stored file information at any given time;
   a counter adapted to count a number of write operations for the one of the rotary storage areas;
   at least one memory buffer for temporarily storing the stored file information to transfer the stored file information to another of the rotary storage areas when a predetermined number of write operations have been performed on the one of the rotary storage areas as determined by the counter.

19. The flash memory of claim 18, further comprising a directory structure for organizing the first portion and the second portion of the memory.

20. The flash memory of claim 18, wherein the first portion of the memory includes directory entries, each directory entry including a field for storing an address of a first data entry wherein data entries are stored in the second memory portion and form a chain of data entries which comprise a message file.

21. The flash memory of claim 20, wherein the data entries each include a pointer which points to an address of a next data entry in the chain of data entries which comprise a message file.

22. The flash memory of claim 18, wherein each directory entry includes an alias identifier for representing a type and availability of data stored in the directory entry.

23. The flash memory of claim 18, wherein the file allocation table provides a map of memory usage in the flash memory.

24. The flash memory of claim 18, wherein the file allocation table includes an alias identifier for designating usage of a row of memory.

25. The flash memory of claim 18, wherein the flash memory is employed in a telephone answering system.

26. The flash memory of claim 25, further comprising a write protected portion of memory for recording one of prompts and announcements for the answering system.

27. The flash memory of claim 18, further comprising a file manager program for managing the transfer of the stored file information.

* * * * *